United States Patent Office 3,128,156
Patented Apr. 7, 1964

3,128,156
RECOVERY AND SEPARATION OF COBALT AND NICKEL
Ray S. Long, Concord, and James E. Magner, Antioch, Calif., assignors to The Dow Chemical Company, Midland, Mich., a corporation of Delaware
No Drawing. Filed Feb. 8, 1960, Ser. No. 7,119
3 Claims. (Cl. 23—312)

The invention relates to an improved method of selectively separating cobalt and nickel from aqueous solution and more particularly relates to the recovery of cobalt and nickel values from an acidic solution such as a sulfate leach liquor and thereafter the selective separation of the cobalt values from the nickel values.

The selective separation of cobalt from nickel in an ore recovery process is a problem which has long plagued the metallurgical industry. Many schemes have been proposed to accomplish this separation but none have been entirely satisfactory. Some schemes permit high recoveries of an admixture of cobalt and nickel from leach liquor but produce separate cobalt and nickel fractions of low purity. Other schemes permit the selective separation of cobalt and nickel in high purity but the recovery efficiency from the leach liquor is very low. Some schemes also do not facilitate the efficient recovery of cobalt and nickel from leach liquors containing copper and iron. Still other schemes are technically feasible but economically not attractive.

It is therefore an object of the invention to provide a method of separating cobalt and nickel which overcomes the disadvantages of the previous methods.

A specific object of the invention is to provide a method of substantially completely separating cobalt values from an aqueous mixture containing cobalt and nickel values.

Another specific object of the invention is to provide a method of efficiently recovering cobalt and nickel values from a sulfate leach liquor which may contain iron and copper values in addition to cobalt and nickel values, and selectively separating cobalt values and nickel values in high purity.

These and other objects and advantages of the present invention are hereinafter more fully described and defined by the following specification and claims.

The invention is predicated on the discovery that upon contacting cobalt and nickel, in aqueous acidic chloride solution, with an anion extractant consisting essentially of the hydrochloride of a moderately strongly basic, substantially water insoluble amine, dissolved in a suitable water-immiscible liquid medium, said amine hydrochloride having a partition coefficient favoring its retention in the water-immiscible liquid medium, whereby an anionic chloride complex of cobalt is taken up by the anion extractant and separating the loaded anion extractant from the aqueous acidic chloride solution, cobalt is selectively and substantially completely removed from the aqueous acidic chloride solution in which the nickel values are retained.

In carrying out the method of the invention an aqueous solution containing cobalt and nickel values substantially in the absence of copper and iron and other heavy metals is made at least 3 molar with respect to chloride ion by the addition of the requisite amount of hydrochloric acid, sodium chloride or a mixture thereof, though hydrochloric acid is to be preferred because it simultaneously provides the necessary chloride and hydrogen ion. In the presence of such a relatively high concentration of chloride ions cobaltous ions form an anionic complex, $CoCl_4^=$, in sharp distinction to the nickelous ions which do not form a similar chloride complex. The acidic chloridic solution is then acidified, if necessary, as with hydrochloric acid or another strong mineral acid to a pH value at least as low as 3 and preferably lower than 1. Selective extraction of the cobalt chloride complex is accomplished by intimately contacting the acidic chloridic solution, in well known solvent extraction apparatus of either the batch or continuous feed type, with about an equal volume of an anion extractant consisting essentially of the hydrochloride form of a suitably basic, substantially water-insoluble amine dissolved in a water-immiscible hydrocarbon such as toluene. The amine in hydrochloride form serves as the extracting agent, since the cobalt chloride complex is quite completely and selectively taken up into the anion extractant and upon quantitatively separating the anion extractant and aqueous phases the cobalt and nickel values are so effectively separated that substantially no cross-contamination remains.

Nickel is recoverable directly from the cobalt-free aqueous phase, as by electrolysis, reduction with a reducing gas, and other well known chemical methods of recovering nickel values.

Cobalt values are stripped from the anion extractant with water. A water to loaded anion extractant volume ratio in the range of about 1:1 to 1:5 is suitable for thorough stripping. After separation of the anion extractant from the so-obtained aqueous solution of cobalt chloride the anion extractant may be reused in the nickel-cobalt separation step. Cobalt values are recoverable from the aqueous solutions of cobalt chloride by electrolysis or other well known methods.

Amines which may be employed as extracting agents in the anion extractant of the invention which is used to selectively take up the cobalt chloride complex are those having a pK value of about 10 or higher. pK is a measure of basic strength, or more specifically the negative logarithm of the dissociation constant of the reaction wherein alkylammonium ion dissociates into a free amine and hydrogen ion.

$$RNH_3^+ \rightarrow RNH_2 + H^+$$

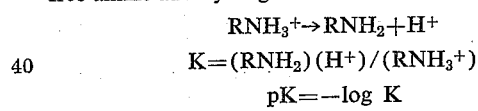

$$pK = -\log K$$

Such moderately strongly basic amines in acidic solution remain almost entirely in the protonated form, i.e., in the form having a proton attached thereto, whereby they carry a positive charge and efficiently attract and hold the anionic complex $CoCl_4^=$ in the organic phase.

While a certain degree of water solubility on the part of the amine used may be tolerated depending on the cost of the amine, provisions for recycling the anion extractant and the overall economics of the process, it is generally preferred that not more than 0.1 volume percent of the amine used in hydrochloride form is taken up by the aqueous acidic chloride solution in competition with the water-immiscible hydrocarbon solvent. In other words, the partition coefficient of the amine hydrochloride, which is a measure of its distribution between the organic and aqueous phases, must be favorable to its retention in the water-immiscible medium as a result of high amine hydrochloride solubility therein relative to its water solubility, and therefore favorable to utility of the amine in an extraction process.

Amines having the property of being moderately strongly basic, i.e., having a pK value above 10, and at the same time substantial insolubility in cold water generally exhibit the desired behavior in hydrochloride form.

Suitable amines also have the property that their hydrochloride salts are substantially soluble in hydrocarbon media, at least to the extent of about 5 volume percent and preferably more than about 10 volume percent.

Suitable amines are to be found among higher alkyl primary and secondary amines and include a number of tertiary alkyl amines. Some lower alkyl amines which are stronger bases tend to be water soluble and their hydrochlorides tend to be hydrocarbon insoluble, while some high molecular weight alkyl amines which tend to be less water soluble also tend to run lower in base strength.

Alkyl amines containing from about 7 to 50 carbon atoms may be employed but preferably those alkyl amines containing from about 12 to 24 carbon atoms are to be preferred. The alkyl radicals may be branched or straight chain. Many of the alkyl amines having the desired combination of properties are found to be tertiary alkyl amines.

Tertiary alkyl amines which may be employed are those containing from about 7 to 50 carbon atoms per molecule of the structure:

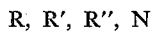

where R, R' and R'' may be the same or different and are selected from alkyl, alkoxyalkyl, aralkyl, polyglycol and ether radicals. Suitable tertiary amines include, for example:

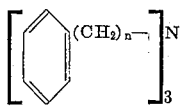

where $n$ may vary from 1 to 10,

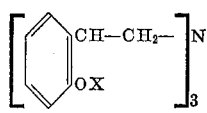

where X may be H, alkyl radical or polyglycol radical,

where X may be H, or an alkyl radical or polyglycol radical having from 3 to 15 carbon atoms and $n$ may vary from 3 to 12,

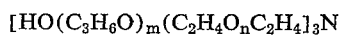

where $m$ may vary from 0 to 5 and $n$ may vary from 0 to 7.

The above tertiary amines preferably have a molecular weight of about 400 to 1000.

More specifically, among the suitable amines are included $x$-heptylamines, $x$-dodecylamines, didodecylamine, tri-$x$-propylamine, tri-$x$-butylamines, tri(2 - ethylhexyl) amine, triisooctylamine, tertiary amines which are derivatives of styrene oxide such as di(2-hydroxy-2-phenylethyl) ethylamine and tertiary amines which are polyglycolamines, such as tripropyleneglycolamine. The use of $x$ hereinabove as in the term "$x$-heptylamines" is intended to refer to any structural isomers, as 1-n-heptyl-amine, 2-n-heptylamine, etc.

Suitable water-immiscible hydrocarbons which may be used as a solvent for the extracting agent, that is, the amines in protonated form, include benzene, toluene, xylene and related aromatic homologs and analogs. Kerosene may also be used if it is modified as by adding thereto about 3 to 15 percent of tri-butyl phosphate, a long chain alcohol such as dodecyl alcohol, or similar solubilizing agent to promote dissolution of the amine hydrochloride in kerosene. Useful concentrations of the amine in the solvent are in the range of about 5 to 50 volume percent and preferably about 10 to 20 percent.

To determine the effect of chloride concentration in the aqueous cobalt chloride solution, on the distribution of cobalt between the aqueous phase and the anion extractant, a series of experiments were run in which portions of an aqueous cobalt solution containing 1 gram per liter of cobaltous ion and various concentrations of hydrochloric acid were equilibrated with an equal volume of a 10 volume percent solution of tri-isooctylamine in toluene. The organic and aqueous phases were then sampled and analyzed for cobalt content. The data are shown in Table I.

TABLE I

*Effect of Hydrochloric Acid Concentration on Cobalt Distribution Between Organic and Aqueous Phases*

| Molarity of HCl | $K\frac{\text{Conc. Co (organic)}}{\text{Conc. Co (aqueous)}}$ |
|---|---|
| 2 | 0.5 |
| 3 | 1 |
| 4 | 14 |
| 5 | 20 |
| 6 | 24 |

In recovering cobalt and nickel from an acidic leach liquor, such as a sulfate leach liquor containing about 0.5 to 10 grams per liter of cobalt values in addition to 0.5 to 10 grams per liter of nickel values, the leach liquor is usually treated with hydrogen sulfide and filtered. The hydrogen sulfide serves the dual purpose of precipitating as the sulfide copper which may be present in the leach liquor, while ferric iron is reduced to the ferrous state in which form the iron will not interfere with the first solvent extraction step to follow. Other well known chemical methods of freeing the leach liquor of copper and ferric iron may be used if desired providing cobalt and nickel values are retained in the leach liquor.

The sulfide-treated and filtered liquor is then contacted with a cation extractant in the form of an oil-soluble organic sulfonic acid dissolved in a water-immiscible non-polar solvent such as kerosene. Nickel and cobalt values are efficiently and selectively taken up by this cation extractant with little or no contamination by such metals as ferrous iron, vanadium, molybdenum, aluminum, silicon, or titanium.

Sulfonated hydrocarbons which serve the purpose of the invention include long chain alkyl sulfonates having a chain length of from 8 to 40 carbon atoms, as well as alkyl-aryl and aryl-alkyl sulfonates having molecular weights in the range of 300 to 600. While some sulfonated hydrocarbons and hydrocarbon derivatives are soluble in water and polar solvents the sulfonates suitable for use in the present process are soluble only in non-polar solvents and belong to a generally recognized class of sulfonated compounds which are useful as surfactants, detergents and wetting agents, though these surface active qualities are not believed to be related to the use of the compounds in the present invention.

The sulfonated compounds of commerce are generally sold and shipped as the sodium salt. While these sodium salts are not often soluble in a non-polar solvent the salt is readily transformed into the sulfonic acid upon bringing it into contact with an acidic aqueous solution. In any event, it is necessary only that upon admixing the sodium salt of the sulfonate, the non-polar solvent, and the aqueous acidic leach liquor containing cobalt and nickel values, the sodium sulfonate salt be transformable into the cobalt and nickel sulfonate salts and that these cobalt and nickel salts are preferentially taken up by the non-polar solvent.

Examples of suitable sulfonated compounds include sodium benzyl diphenyl oxide disulfonate, dinonyl naphthalene sulfonic acid, dodecyl naphthalene sulfonate, and polyvinyl toluene sulfonate.

The non-polar solvent employed in making up the cation extractant may be almost any water-immiscible organic solvent which readily dissolves the sulfonated compound used as the extracting agent. However, economics and availability dictate that an aliphatic hydrocarbon solvent such as kerosene, naphtha or gasoline will usually be used.

In the present process, the sulfonated compound is usually employed at a concentration of 5 to 20 volume percent of organic solvent and preferably at about 10 volume percent. The leach liquor to cation extractant volume ratio may be between 4:1 and 1:1 or as needed to take up or "load" about 2 grams per liter each of nickel and cobalt into the cation extractant. The extraction is best carried out in a conventional counter-current extraction apparatus which provides intimate mixing for about 5 minutes in each of at least three stages and subsequent phase separation after each stage. The barren leach liquor, or raffinate, may be recycled if desired. The separated "loaded" cation extractant containing substantially only cobalt and nickel values is stripped by countercurrent extraction with an aqueous chloride solution, preferably 6 molar aqueous hydrochloric acid. A "loaded" cation extractant to chloride solution volume ratio in the range of 1:1 to 5:1 is satisfactory for complete stripping of the organic liquid. After being so-stripped the cation extractant is advantageously recycled in the process for economic reasons. The chloride solution containing cobalt and nickel values is then processed as described hereinabove to selectively separate the cobalt and nickel.

EXAMPLE

As an example of the process of the invention a simulated sulfate leach liquor was made up which had a pH of 1 and contained 1.4 grams of cobalt per liter and 1.8 grams nickel per liter, both being in the form of sulfates. This sulfate liquor was contacted with a cation extractant in the form of an organic liquid, consisting of a 10 volume percent solution of dinonylnaphthalene sulfonic acid in kerosene, in a conventional laboratory mixer-settler unit having three counter-current stages. The solvent extraction unit was set up for continuous operation and the flow ratio of the aqueous to organic phases was adjusted to 2:1. The "loaded" cation extractant phase containing nickel and cobalt values collected from the third mixer-settler stage was stripped of its cobalt and nickel content in one stage by countercurrent stripping with 8 molar hydrochloric acid. During stripping the flow ratio of the organic phase to the aqueous phase was maintained at 2.5:1.

The resulting aqueous acidic chloride solution was contacted in a single stage with an anion extractant in the form of an organic liquid consisting of a 10 volume percent solution of triisooctyl amine hydrochloride in toluene. The flow ratio of organic to aqueous phases was maintained at about 1:1 during the extraction of the cobalt values. The so-loaded cation extractant was then stripped of its cobalt content with water in a single countercurrent stage.

The solvent-extraction unit was operated for 6 hours on a continuous basis to assure having steady state conditions. Both organic extractant streams were recycled continuously. The several streams or phases were then sampled and analyzed. Flow rates and analyses are listed in Table II.

In an additional experiment nickel and cobalt were stripped from the cation extractant with 6 molar aqueous hydrochloric acid and the cobalt extracted from the acidic chloride solution in the same manner as in the foregoing experiment. Analysis of the circulating streams showed substantially the same metal ion contents as shown in Table II.

TABLE II

*Spot Analysis of Circulating Streams in Cobalt-Nickel Separation Process*

| Stream | Flow Rate, ml/min. | Cobalt, g./l. | Nickel, g./l. |
| --- | --- | --- | --- |
| Feed "leach liquor" | 30 | 1.4 | 1.8 |
| Raffinate | 30 | 0.5 | 0.8 |
| Loaded cation extractant | 15 | 2.1 | 2.3 |
| Stripped cation extractant | 15 | 0.1 | 0.08 |
| Loaded anion extractant | 6 | 2.5 | <0.01 |
| Stripped anion extractant | 6 | 0.06 | <0.02 |
| Aqueous Ni product stream | 6 | <0.02 | 3.8 |
| Aqueous Co product stream | 2 | 10.2 | <0.01 |

While the efficiency of the extraction of cobalt and nickel from the leach liquor as carried out in this example is not as high as desired, additional experiments carried out on this step alone have shown the efficiency can readily be raised by using several more countercurrent contacting stages or by increasing the cation extractant to leach liquor volume ratio or both.

Among the advantages of the process of the invention are the applicability to highly acidic solutions such as those normally employed in sulfate leaching and the small number of solvent extraction stages required for a sharp separation between cobalt and nickel.

What is claimed is:

1. In a method of recovering cobalt and nickel values from an aqueous acidic solution consisting of a sulfate leach liquor which has been freed of copper and iron values and contains substantially no heavy metal values other than cobalt and nickel, the steps which comprise contacting the said aqueous acidic solution with a cation extractant consisting essentially of a solution of an oil-soluble sulfonated hydrocarbon in a non-polar organic solvent whereby cobalt and nickel values are taken up by the cation extractant; separating the loaded cation extractant from the aqueous acidic phase; contacting the loaded cation extractant with an aqueous chloride solution whereby cobalt and nickel values are stripped into the aqueous chloride solution, said chloride solution containing essentially a chloride selected from the group consisting of hydrochloric acid, sodium chloride and mixtures thereof; separating the cation extractant and the aqueous chloride solution; adjusting the chloride concentration of the aqueous chloride solution to at least 3 molar; contacting the aqueous chloride solution with an anion extractant consisting essentially of a water-immiscible medium having dissolved therein about 5 to 50 volume percent of the hydrochloride of a substantially water-insoluble alkyl amine containing about 7 to 50 carbon atoms and a pK value above about 10, said amine hydrochloride having a partition co-efficient favorable to its retention in the water-immmiscible medium; and separating the anion extractant from the aqueous chloride solution.

2. In a method of recovering cobalt and nickel values from an aqueous acidic solution consisting of a sulfate leach liquor which has been freed of copper and iron values and contains substantially no heavy metal values other than cobalt and nickel, the steps which comprise contacting the said aqueous acidic solution with a cation extractant consisting essentially of a non-polar organic solvent having dissolved therein from about 5 to 20 volume percent of an oil-soluble sulfonated hydrocarbon, separating the loaded cation extractant from the aqueous acidic phase whereby cobalt and nickel values are taken up by the cation extractant; contacting the separated cation extractant with an aqueous chloride solution containing a total chloride concentration of at least 3 molar, said chloride being selected from the group consisting of hydrochloric acid, sodium chloride and mixtures thereof, whereby cobalt and nickel values are stripped into the aqueous chloride solution; separating the cation extractant and the aqueous chloride solution; contacting the aqueous chloride solution with an anion extractant consisting essentially of a water-immiscible medium having dissolved therein about 5 to 50 volume percent of the hydrochloride of a substantially water-insoluble tertiary alkyl amine containing about 7 to 50 carbon atoms and a pK value above about 10, said amine hydrochloride having a partition coefficient favorable to its retention in the water-immiscible medium; and separating the loaded anion extractant from the aqueous chloride solution.

3. In a method of recovering cobalt and nickel values from an aqueous acidic solution consisting of a sulfate leach liquor which has been freed of copper and iron values and contains substantially no heavy metal values other than about 0.5 to 10 grams per liter of cobalt and nickel, the steps which comprise contacting the said aqueous acidic solution with from one-fourth to one part of a cation extractant per part of aqueous acidic solution, the cation extractant consisting essentially of a non-polar organic solvent having dissolved therein from about 5 to 20 volume percent of an oil-soluble sulfonated hydrocarbon compound, whereby cobalt and nickel values are taken up by the cation extractant; separating the loaded cation extractant from the aqueous acidic phase; contacting the loaded cation extractant with an aqueous chloride solution containing a total chloride concentration of at least 3 molar, said chloride being selected from the group consisting of hydrochloric acid, sodium chloride and mixtures thereof, whereby cobalt and nickel values are stripped into the aqueous chloride solution; separating the cation extractant and the aqueous chloride solution; contacting the aqueous chloride solution with about an equal volume of an anion extractant consisting essentially of a water-immiscible organic liquid having dissolved therein about 5 to 50 volume percent of the hydrochloride of a substantially water-insoluble tertiary alkyl amine containing about 7 to 50 carbon atoms and a pK value above about 10, said amine hydrochloride having a partition coefficient favorable to its retention in the water-immiscible organic liquid; and separating the loaded cation extractant from the aqueous chloride solution.

References Cited in the file of this patent
UNITED STATES PATENTS 2,877,250    Brown et al. _____ Mar. 10, 1959

OTHER REFERENCES

Garwin et al.: (I. and E. Chem., vol. 41, No. 10, October 1949).

West: (Metallurgia), July 1956, pp. 50 and 51, article "Liq-Liq Extraction Procedures in Inorganic Analysis."

Coleman et al.: ("Proceedings of International Conference on Peaceful Uses of Atomic Energy"), vol. 28, 1958, pp. 278–287.